United States Patent [19]

Kupka

[11] Patent Number: 4,833,582

[45] Date of Patent: May 23, 1989

[54] FREQUENCY CONVERTER CIRCUIT INCLUDING A SINGLE-ENDED BLOCKING FREQUENCY CONVERTER

[75] Inventor: Detlef Kupka, Martinsried, Fed. Rep. of Germany

[73] Assignee: Siemens Aktiengesellschaft, Berlin and Munich, Fed. Rep. of Germany

[21] Appl. No.: 161,759

[22] Filed: Feb. 29, 1988

[30] Foreign Application Priority Data

Mar. 27, 1987 [DE] Fed. Rep. of Germany ....... 3710181

[51] Int. Cl.[4] .......................................... H02M 3/335
[52] U.S. Cl. ........................................ 363/21; 363/70
[58] Field of Search ........................ 363/16, 21, 67, 70

[56] References Cited

U.S. PATENT DOCUMENTS

| 4,642,743 | 2/1987 | Radcliffe ............................... 363/21 |
| 4,745,538 | 5/1988 | Cross et al. ............................ 363/21 |

FOREIGN PATENT DOCUMENTS

| 0178343 | 4/1986 | European Pat. Off. . |
| 2930198 | 4/1981 | Fed. Rep. of Germany ........ 363/21 |
| 2443763 | 11/1979 | France . |
| 142519 | 11/1979 | Japan ..................................... 363/21 |
| 77372 | 6/1980 | Japan ..................................... 363/21 |
| 86070 | 7/1981 | Japan ..................................... 363/21 |
| 197162 | 10/1985 | Japan ..................................... 363/21 |
| 2037462A | 7/1980 | United Kingdom . |

OTHER PUBLICATIONS

Article Entitled Stromversorguns-systeme der Kommunikationstechnik—by Siemens.
Latest switchers allow you to take advantage of their low cost and small size in a wider variety of applications than ever by Teja-2119 EDN Magazine vol. 26 1981 No. 3, Feb.

Primary Examiner—William H. Beha, Jr.

[57] ABSTRACT

A frequency converter including a single-ended blocking frequency converter for generating a plurality of output voltages. Additional secondary circuits are provided so as to obtain an inexpensive circuit and the additional secondary circuits are provided in addition to a blocking frequency converter secondary circuit and each contain a rectifier diode 13, a switch 12, 12a which are controlled by controller 16, 21 which are arranged in the series branch and each contain a free-wheeling diode 17 in a shunt arm and also contain a LC element 16, 16 which is connected to the free-wheeling diode 17. The frequency converter circuit can be used to feed equipment of electrical communication transmission systems.

3 Claims, 2 Drawing Sheets

FREQUENCY CONVERTER CIRCUIT INCLUDING A SINGLE-ENDED BLOCKING FREQUENCY CONVERTER

BACKGROUND OF THE INVENTION

1. Field of the Invention

This invention relates to a frequency converter circuit which has a primary circuit with a primary winding of a transformer which is connected to a DC voltage source through an electronic switch and a secondary circuit wherein the secondary winding is conducted through a rectifier to a storage capacitor which is arranged at a first feed output. A pulse width modulator controls the electronic switch and is connected to a controller and at least one additional secondary circuit is connected to additional secondary windings of the transformer so as to generate a voltage that is lower than the output voltage of the one secondary circuit and each of the additional secondary circuits contain a rectifier diode and a switch controllable by controllers in a series arm and contain free-wheeling diodes in a shunt arm such that the two diodes are polarized so that they can be connected together and to terminals and wherein a LC element is connected to the free-wheeling diode and the capacitor of such LC element forms a further output of the frequency converter circuit. The frequency converter circuit contains a controller that directly or indirectly regulates the output voltage of the secondary circuit. An actual value which is supplied to the controller can thus be the output voltage of the secondary circuit or the output voltage of an auxiliary circuit which simulates the secondary circuit which is connected to an auxiliary winding of the transformer. EMF control is obtained by the use of the output voltage of the auxiliary circuit which is proportional to the no-load voltage. The EMF control has the advantage that the current separation of the secondary circuit in the controller is accomplished using the transformer.

2. Description of the Prior Art

Power supply devices which are used to supply a plurality of output voltage that differ in amplitudes and polarity and with low variations between no-load and full load are required for feeding communication transmission systems. In many instances such power supply devices are formed as flow frequency converters or blocking frequency converters according to known principles.

The article by H. Gummhalter entitled "Stromversorgungssysteme der Kommunikationstechnik", Part 1, Fundamentals, Pages 215–223, Siemens AG 1983 disclose how to form autoconverters as single-ended flow converters or as single-ended blocking frequency converters.

In the known single-ended flow frequency converter, the energy acceptance at the primary coincides timewise with the energy output at the secondary side.

Primary current flows during the conductive phase of the transistor. Since the primary winding and the secondary winding are wound in the same direction, current will flow secondarily to the load through the conductive diode and the inductor at the same time such that a smoothing capacitor in the secondary circuit is charged. The smoothing inductor connected in the secondary circuit stores energy during this time. The current supply into the secondary circuit is interrupted during the inhibit phase of the switching transistor. The inductor supplies output energy to the load through the free-wheeling diode until the end of the period and until the smoothing capacitor has been discharged. A device for regulation and control switches the transistor so that it is conductive during a period as long as the output DC voltage remains constant with fluctuating input voltage and/or variable load. The demagnitization winding is used so that the transformer does not go into saturation. During the inhibit phase of the switching transistor current flows in the reverse direction through a diode connected in series with the demagnetization winding and through the demagnetization winding and, thus, prepares the transformer for the next conductive phase.

In the known single-ended blocking frequency converter energy pick-up and energy emission are offset in time. During the conductive phase of the switching transistor, current flows only through the primary winding of the transformer because the primary and secondary windings are wound in opposite directions. In the conductive phase of the switching transformer, the diode in the output circuit is polarized in a non-conducting direction so that current does not flow through the secondary winding. The load is supplied only from a smoothing capacitor in the output circuit.

The polarity of the voltage at the transformer reverses in direction during the inhibit phase of the switching transistor. The diode in the output circuit then becomes conductive. The energy stored in the transformer during the conductive phase is supplied to the load. The smoothing capacitor is recharged at the same time.

Autoconverters which allow a plurality of output voltages to be generated can be provided with an EMF control and can be provided with a re-adjustment means and at least part of the output circuits. In the known EMF control circuits, the output voltage of an auxiliary winding of the transformer is used as the actual value and is compared to the rated value of a shared rated value generator in the regulation and control. The wiring of the auxiliary winding is the same as in the secondary windings for the output voltages.

SUMMARY OF THE INVENTION

According to the invention, it is advantageous in special instances to depart from the usually required identical construction of the output circuits of the blocking frequency converter. When the blocking frequency converter has a plurality of output circuits for significantly different voltage values, then a EMF control can only be optimized in practice for one of the output circuits. The remaining output circuits must be readjusted.

It is an object of the present invention to provide a frequency converter which allows readjustment and can be constructed for a relatively low cost.

According to the invention, the frequency converter circuit is formed such that the rectifier diode and the controllable switch are mounted in the same or in different series arms. The controllable switch may be a semiconductor switch preferably a power field effect transistor.

An advantageous frequency converter circuit which does not require large capacity storage capacitors in the additional secondary circuits results from the invention.

According to the invention, the cost of the switching readjustment unit is low. Particularly neither clock generators nor pulse width modulators are required.

This results in an advantage in that an output having a comparatively high voltage is obtained and the frequency converter circuit also produces a plurality of outputs for relatively low voltages and are comparatively high currents can be provided with readjustment units.

The direction of the secondary winding of the transformer can have arbitrary winding senses in the additional secondary circuits which are provided with the readjustment units.

The invention provides the advantage that the frequency converter circuit combines the advantages of a blocking frequency converter with those of a flow frequency converter.

Other objects, features and advantages of the invention will become apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
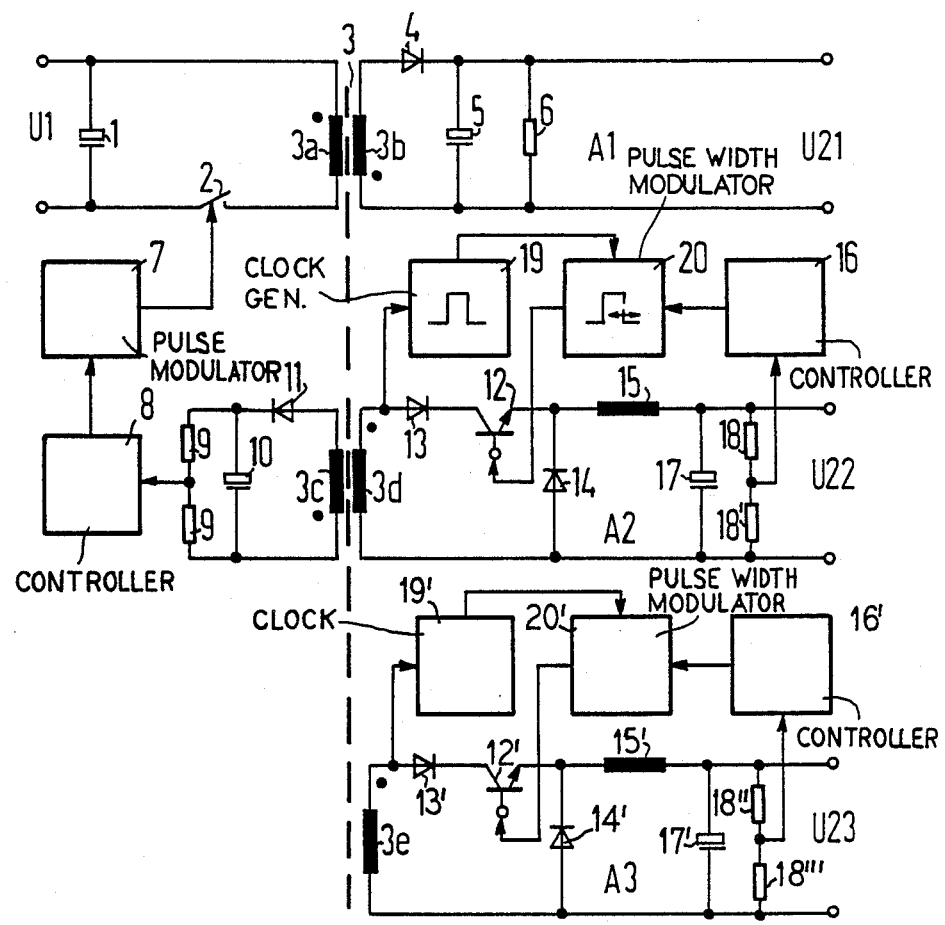
FIG. 1 is a block diagram of a frequency converter circuit which has a single-ended blocking frequency converter that includes two additional secondary circuits each having a switching readjustment unit.

FIG. 1 illustrates the frequency converter circuit according to the invention which receives an input voltage U1. A capacitor 1 is connected across the input terminals and is connected to the primary winding 3a of a transformer 3 through an electronic switch 2. A diode 4 and a charging capacitor 5 are connected in series across the secondary 3b of the transformer 3. A resistor 6 provides the load and is connected in parallel with capacitor 5. Output terminals are connected across the load 6 and an output voltage U21 is obtained across the resistor 6.

The transformer 3 including the primary circuit 3a and the first secondary circuit 3b forms a blocking frequency converter. The blocking frequency converter is provided with an arrangement for EMF control. The control arrangement contains an auxiliary circuit which is connected to the auxiliary winding 3c of the transformer 3. This auxiliary circuit simulates the first secondary circuit and contains a diode 11 and a capacitor 10 connected in series across the winding 3c. A voltage divider comprising a pair of resistors 9 and 9' are connected in parallel with the capacitor 10 and an auxiliary voltage which is proportional to the no-load voltage of the blocking frequency converter is generated with the voltage divider comprising the resistors 9 and 9'.

A controller 8 is connected to the junction point between the resistors 9 and 9' and produces an output signal which corresponds to the repetitive error from a reference voltage and from the auxiliary voltage which is supplied to a pulse width modulator 7. The pulse width modulator 7 is connected to the electronic switch 2 and controls it such that the EMF or, respectively, the no-load voltage of the blocking frequency converter is at least approximately maintained at a constant level.

The EMF control is optimized for the output circuit A1.

A circuit which differs from FIG. 1, can be provided where control can be potentially provided which uses the output voltage U21 which is regulated to a constant value as the actual value.

The frequency converter circuit is provided with a plurality of additional secondary circuits A2 and A3. Each of these secondary circuits A2 and A3 contains a switching readjustment unit which regulates the output voltage U22 or, respectively, U23 of the secondary circuit to a constant value. In the secondary circuit A2, a series circuit formed of a rectifier diode 13 and a transistor 12 and a free-wheeling diode 14 are connected in series across the additional secondary winding 3d. The free-wheeling diode 14 is connected with opposite polarity to the diode 13 and the transistor 12. An inductor 15 and a capacitor 17 are connected in series across the free-wheeling diode 14. A voltage divider comprising resistors 18 and 18' connected in series is connected across the capacitor 17 and the output voltage U22 is across the capacitor 17. The junction point between the voltage divider comprising the resistors 18 and 18' is connected to a controller 16. The controller 16 controls the transistor 12 through the pulse width modulator 20. The pulse width modulator 20 is synchronized by a clock generator 19 that receives an output from one end of the secondary winding 3d.

The secondary circuit A3 is connected across a secondary winding 3e. A diode 13', a transistor 12' and a free-wheeling diode 14' are connected in series across the winding 3e. An inductor 15' and a capacitor 17' are connected in series across the free-wheeling diode 14'. A voltage divider comprises resistors 18" and 18'" connected in series across the capacitor 17' and the junction point between the resistors 18" and 18'" is connected to a controller 16' which controls the transistor 12' through the pulse-width modulator 20'. A clock generator 19' receives an input from one end of the secondary 3e and supplies a control signal to the pulse width modulator 20' as shown. An output voltage U23 appears across the capacitor 17'.

In a preferred embodiment, the output voltages and the associated output currents are respectively, U21=95 volts at 0.6 A and voltage U22 = +5 V and 2 A. The output voltage U23 is −5 V and 0.5 A.

The frequency converter circuit represents a blocking frequency converter for the high voltage U21. The direction of windings for the additional secondary windings 3d and 3e is selected such that the frequency converter circuit operates in a forward phase for the two lower voltages U22 and U23.

Flow frequency converters are specially suited for generating low output voltages for example, 2 V ... 15 V where high load current exist. The disadvantage of the flow frequency converter principle as compared to the blocking frequency converter is that two rectifiers, a filter choke, a filter capacitor and a basic load are required for each output circuit in addition to the transformer. Also, the demagnetization of the transformer must be assured, for example, on the basis of a RCD wiring arrangement or other measures. It is a particular advantageous with high currents to have the current in the filtering chokes which maintain the effective current in the capacitor low. Using shared EMF control tolerances up to about +5% are obtained and given lower tolerances and or given more output circuits having low voltages, for example, 5 V readjustment must, however, be carried out since the scatter of the threshold voltage of the rectifier has an excessive influence on synchronization.

Blocking frequency converters are specially suited for generating high output voltages of, for example, about 100 V or more for low load currents exist.

The advantage of the blocking frequency converter prinicple is that only one magnetic component part for the storage transformer and one rectifier, one charging capacitor and one basic load are required for each output circuit. The demagnetization of the transformer occurs on the output circuits and requires no additional circuit cost. It is disadvantageous that at high currents, large capacitors must be used because of the effective loading.

The frequency converter illustrated in FIG. 1 is referred to as a blocking-flow frequency converter. The blocking flow frequency converter has the advantages of both basic circuits. During the inhibit phase, the voltage U21 is generated and is maintained constant with the assistance of the EMF control and the two lower voltages U22 and U23 are generated in the flow phase. Since the demagnetization of the transformer 3 occurs in the output circuit A1 the special measures for demagnetization required generally for standard flow frequency converters are not required for the additional secondary circuits A2 and A3.

Since the changes in the pulse duty cycle factor of the control blocking frequency converter depend on the supply voltage U1 are always smaller than the change in pulse-duty factor of a corresponding flow frequency converter, the voltages U22 and U23 in circuits A2 and A3 without readjustment would upon a doubling of the supply voltage U1 theoretically rise 33% assuming a maximum pulse duty factor $\gamma_{max}=0.7$ or, respectively, 50% with $\gamma_{max}=0.5$. These voltage changes are maintained level with a respective switching readjustment unit having good efficiency. The blocking flow frequency converter has the additional advantage that no bulky charging capacitors are required for the output circuits A2 and A3.

Figure 2:
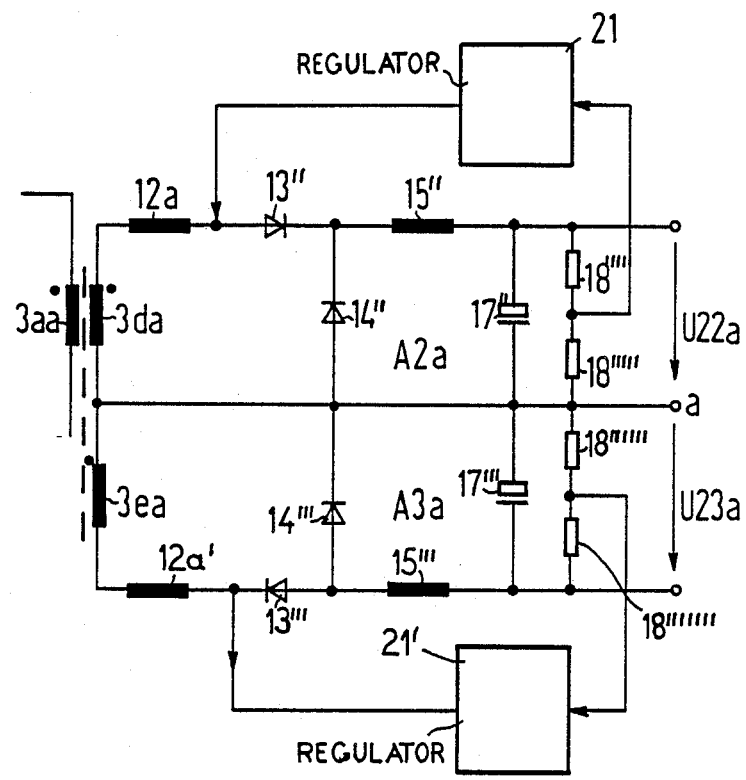
FIG. 2 is a block diagram showing two transductor readjustment units that can be used in the frequency converter circuit of FIG. 1.

FIG. 2 illustrates two further secondary circuits A2a and A3a for a frequency converter of FIG. 1 and each of the secondary circuits include a transductor 12a and 12a' which serves as the control switch instead of the transistor 12 illustrated in FIG. 1. The transductor 12a is controlled by the regulator 21 with a DC current. This current controls the voltage time level after which the voltage at the transductor collapses such that the transductor becomes practically conductive. Since the controller 21 forms the control current as an analog+ quantity dependent on the repetitive error, the clock generator 19 and the pulse width modulator of FIG. 1 are not required so that an especially low cost control results. A further advantage is that the two secondary windings 3da and 3ea need not be electrically separated from each other since the two controllers control the associated transductors with a direct current.

The two secondary windings 3da and 3ea are in series with the same winding direction. The junction point between the secondary windings 3da and 3da is directly connected to a terminal a which is shared by the two outputs U22a and U23a. Relative to terminal a, the output voltage is U22a and U23a which extend in opposite directions as shown. Each of the circuits A2a and A3a have chokes 12a, diodes 13″ and a choke 15′ as well as the diodes 14″ and the capacitor 17″ and the voltage divider comprising the resistors 18″″ and 18″″. The circuit A3a is similar to the circuit A2a as shown.

Although the invention has been described with respect to preferred embodiments, it is not to be so limited as changes and modifications can be made which are within the full intended scope of the invention as defined by the appended claims.

I claim as my invention:

1. A converter circuit with a single-ended single-phase block converter, comprising, a transformer with a primary winding (3a) which is connected to a DC voltage source through an electronic switch, a secondary winding (3b) of said transformer, a rectifier (4) connected to said secondary winding, a storage-capacitor (5) connected across said rectifier and said secondary winding, a first output connected across said storage capacitor, a pulse width modulator (7) connected to the control of said electronic switch, a control unit (8) connected to said pulse width modulator and receiving an input from said transformer, at least one other secondary circuit (A2, A3) connected to another secondary winding (3d) of said transformer (3) so as to generate a voltage which is smaller than the output voltage of said first output, said secondary circuit (A2, A3) containing, in a series arm, a second rectifier (13) and a second electronic switch (12), a second control unit connected to the control element of said second electronic switch, a recovery diode (14), connected across said another secondary winding, said second rectifier and said second electronic switch, an inductor (15) and a second capacitor (17) connected in parallel with said recovery diode (14), said second capacitor (17) forming another output circuit of said converter circuit, said second rectifier (13) and said recovery diode (14) are connected together so that like terminals are adjacent, and the sense of winding of said other secondary winding (3da, 3ea) is selected such that said other output circuit together with the primary circuit of said block converter form a flow converter.

2. A frequency converter circuit according to claim 1, wherein said controllable electronic switch (12) is a transductor.

3. A frequency converter circuit according to claim 1 or 2, comprising second and third secondary windings (3da, 3ea) of said transformer connected together and second and third output circuits connected thereto, such that with the primary circuit of said blocking frequency converter a flow frequency converter is formed.

* * * * *